UNITED STATES PATENT OFFICE.

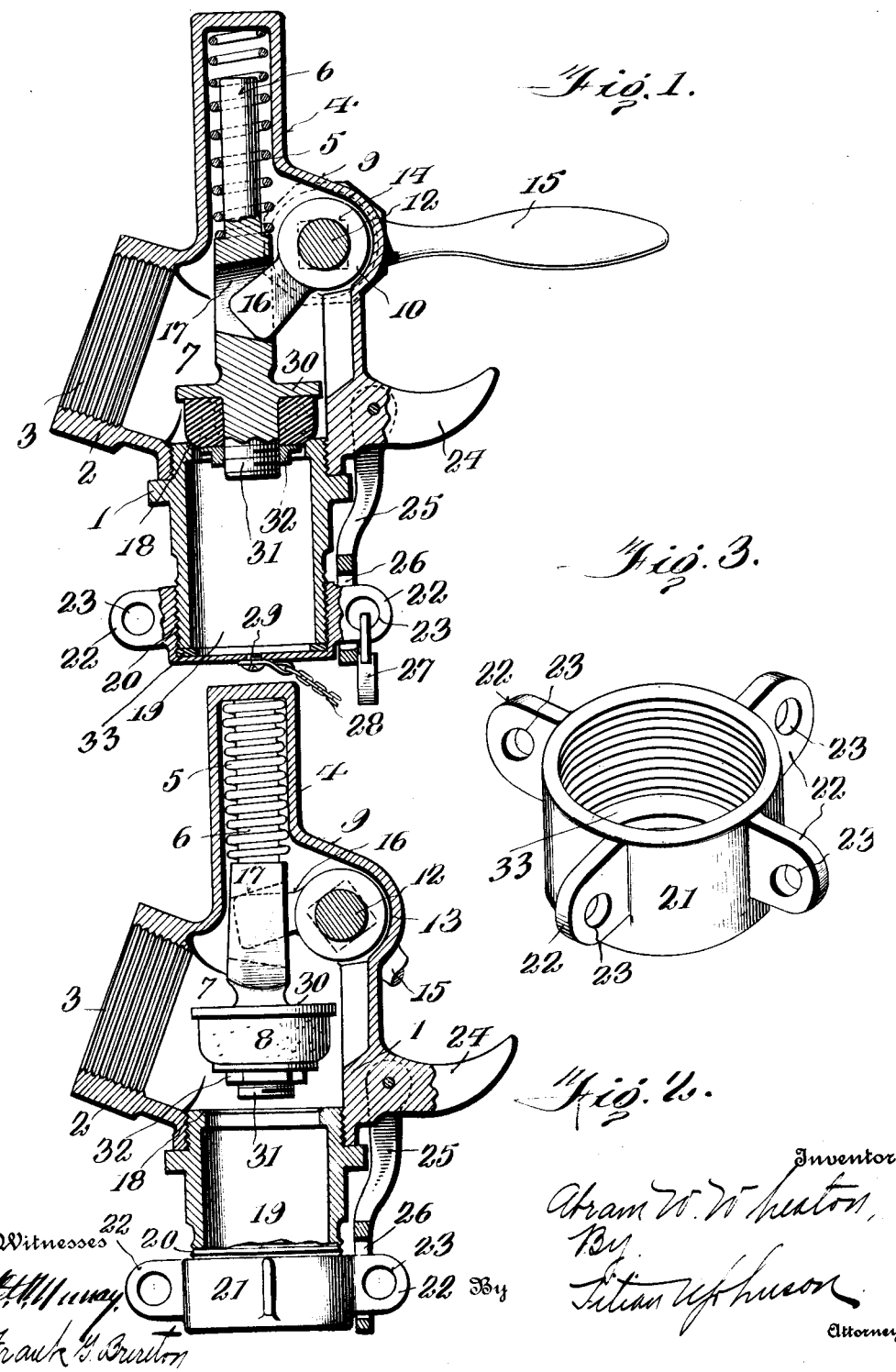

ABRAM W. WHEATON, OF NEWARK, NEW JERSEY.

FAUCET.

1,052,296.

Specification of Letters Patent.

Patented Feb. 4, 1913.

Application filed May 2, 1912. Serial No. 694,782.

*To all whom it may concern:*

Be it known that I, ABRAM W. WHEATON, a citizen of the United States, residing at Newark, in the county of Essex and State of New Jersey, have invented certain new and useful Improvements in Faucets, of which the following is a specification.

This invention relates to improvements in faucets, particularly adapted for use upon oil and gasolene tank wagons.

The object of the invention is to provide a simple and efficient construction wherein the valve may be readily replaced when it has become worn, and one that may be closed and locked against the use by unauthorized persons, as is highly desirable in dispensing oil, gasolene and the like from wagons of this character.

A further object of the invention is to provide a construction wherein means is provided for holding the receptacle while the same is being filled.

In the drawings—Figure 1 is a vertical sectional view of the faucet, showing the same closed; Fig. 2 is a similar view, showing the faucet open; Fig. 3 is a perspective view of the screw cap, for closing the faucet and locking the same against unauthorized interference.

Referring to the several views, the numeral 1 indicates a faucet provided with an extension 2 internally screw-threaded, as shown at 3, for the reception of the threaded end of the usual tank-wagon pipe, (not shown). The upper portion of the body of the faucet is formed with an extension 4, serving as a casing for a spiral spring 5, surrounding the stem 6 of the valve 7, the body 8 of said valve being composed of rubber. The faucet is also provided with an extension or off-set 9 in which is journaled, in suitable bearings 10, (only one being shown) a short shaft 12 which has one of its ends squared, as shown by dotted lines 14, to receive a suitable wrench or handle 15. Rigidly secured to the shaft, within the body, is an arm 16, which works in a transverse slot 17 in the stem of the valve, so that when the shaft 12 is turned in one direction, the valve will be raised. The valve has a seat 18 at the upper edge of the nozzle 19, which nozzle is threaded into an opening in the lower part of the body 1. The nozzle at its lower end is threaded as indicated at 20, for the reception of the internally threaded cap 21, which is provided at intervals upon its periphery, with ears 22, having apertures 23 therein.

Extending from the front of the faucet and integral with the body 1, is a hook 24, to which a bucket or pail may be hung while the same is being filled. Pivoted to this hook near the body, is a link 25, provided with an elongated aperture 26 near its lower end, which is adapted to embrace one or the other of the lugs or ears 22, and extend sufficiently over said ear to expose the aperture for the reception of a lock 27 which may be secured to a chain or other tie 28, which has its opposite end attached to a screw 29 in the bottom of the cap 21.

Reverting now to the construction of the valve it will be seen that the stem is provided with an integral disk 30 having a depending stem 31 on which is mounted the rubber body 8, said body being held against the disk by means of a clamping-nut 32. By thus constructing the valve it will readily be seen that the rubber body may be conveniently replaced, when it has become worn, by simply removing the clamping-nut.

In operation, it is only necessary to manipulate the shaft 12, to open the valve against the influence of the spring 5, and hold the same open sufficiently long to pass out the desired quantity of fluid, when, by relieving the pressure upon the handle, the spring will automatically close the valve.

The numeral 33 designates a gasket of compressible material, which, when the cap is on the faucet, and locked thereon, is in engagement with the lower body portion of the faucet, thus serving as an additional means for preventing leakage.

Having thus described my invention, what I claim is:—

1. A faucet comprising a body having a threaded inlet, and a threaded outlet opening, a nozzle threaded into the outlet opening and having a valve seat at its upper end, a valve adapted to seat upon said seat, means for reciprocating the valve to seat or unseat the valve, the nozzle being threaded at its lower end, an internally threaded cap to fit over the lower end of said nozzle, said cap being provided with a series of laterally extending apertured ears, a hook secured to the body, a link pivoted to the hook and provided with an aperture at its lower end adapted to embrace one or the other of the lugs on the cap, and means for locking the link to the lug.

2. A faucet comprising a body having an inlet opening and an outlet opening, a nozzle threaded into the outlet opening, said nozzle being threaded externally at its lower end and provided with a valve seat at its upper end, a spring-pressed valve in said body, a laterally extending shaft provided with an arm adapted to engage the shank of the valve to raise the same against the influence of the spring, a hook integral with the valve body, a link pivoted to said hook and having an elongated aperture in the lower part thereof, and an internally threaded cap adapted to fit over the nozzle said cap being provided with a series of laterally extending lugs each adapted to be embraced in the aperture of the link, and means for locking the link to the lug.

In testimony whereof I affix my signature in presence of two witnesses.

ABRAM W. WHEATON.

Witnesses:
WALTER S. JACOBUS,
P. C. RICHARDSON.